Dec. 4, 1951 R. H. CARSON 2,577,403
APPARATUS FOR COMMINUTING MATERIALS
Filed Aug. 16, 1947 5 Sheets-Sheet 1

Inventor
Robert H. Carson
by Popp and Popp
Attorneys

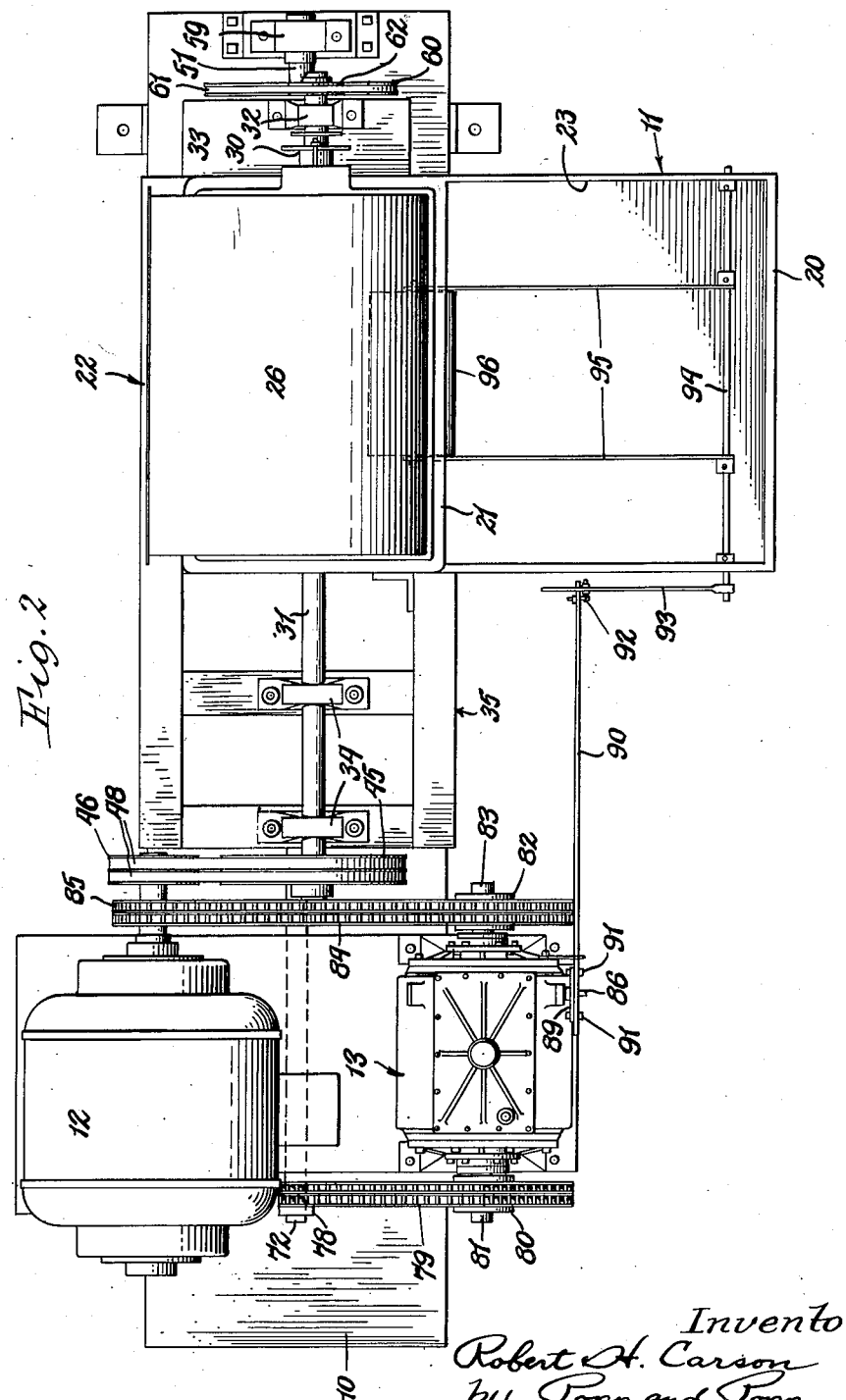

Dec. 4, 1951 R. H. CARSON 2,577,403
APPARATUS FOR COMMINUTING MATERIALS
Filed Aug. 16, 1947 5 Sheets-Sheet 3
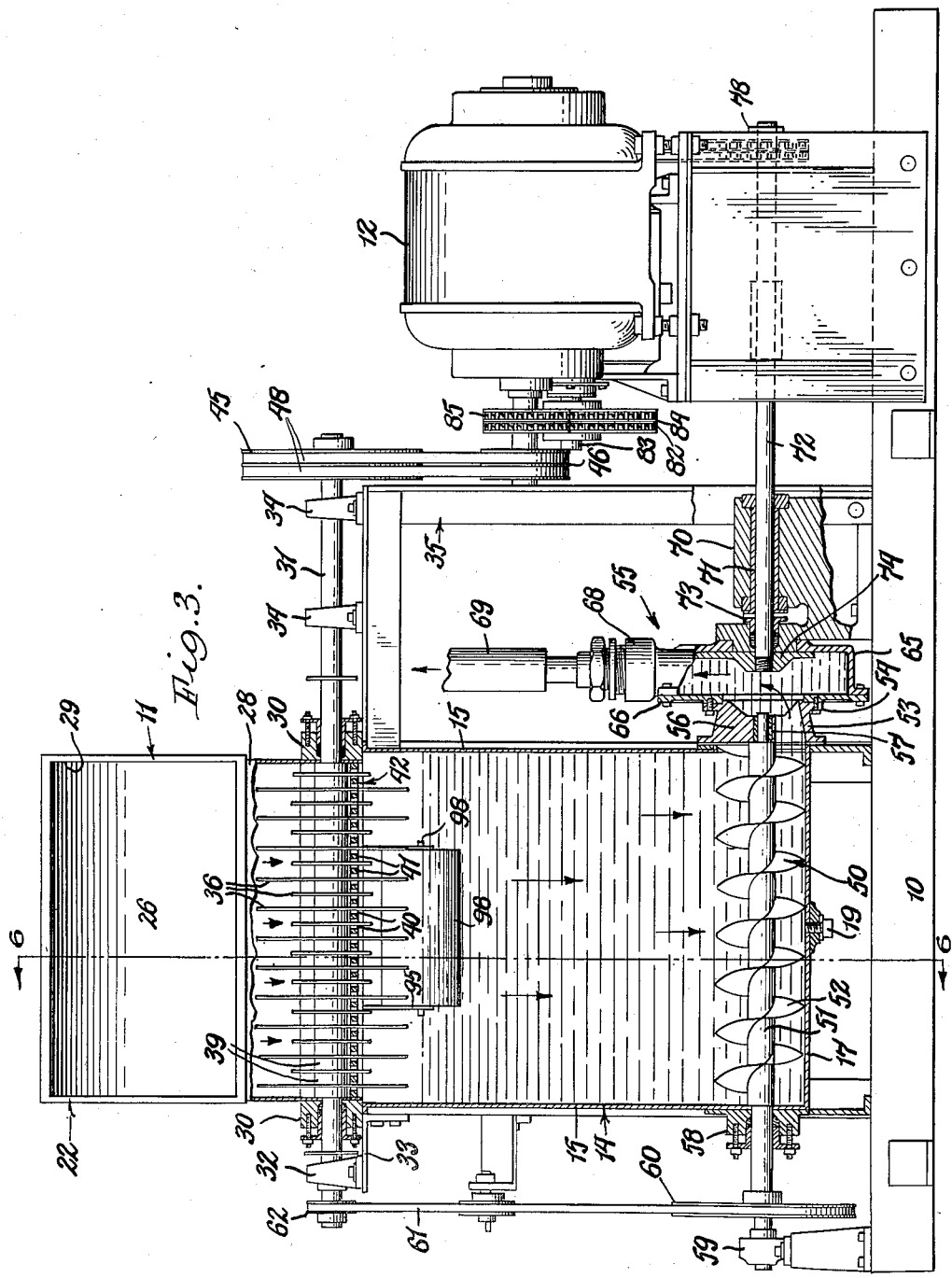
Robert H. Carson Inventor
by Popp and Popp
Attorneys Dec. 4, 1951        R. H. CARSON        2,577,403
APPARATUS FOR COMMINUTING MATERIALS
Filed Aug. 16, 1947        5 Sheets—Sheet 4
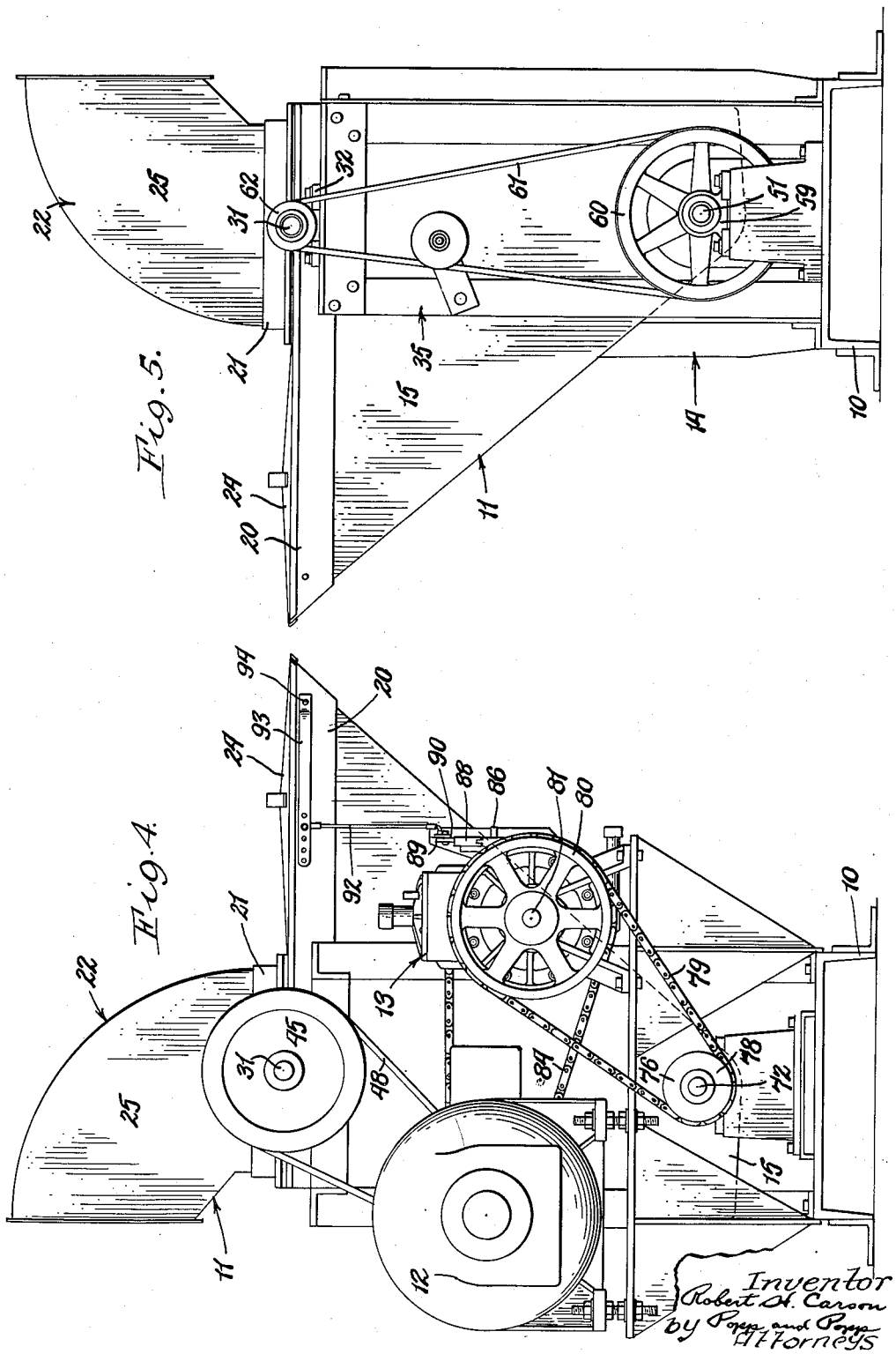

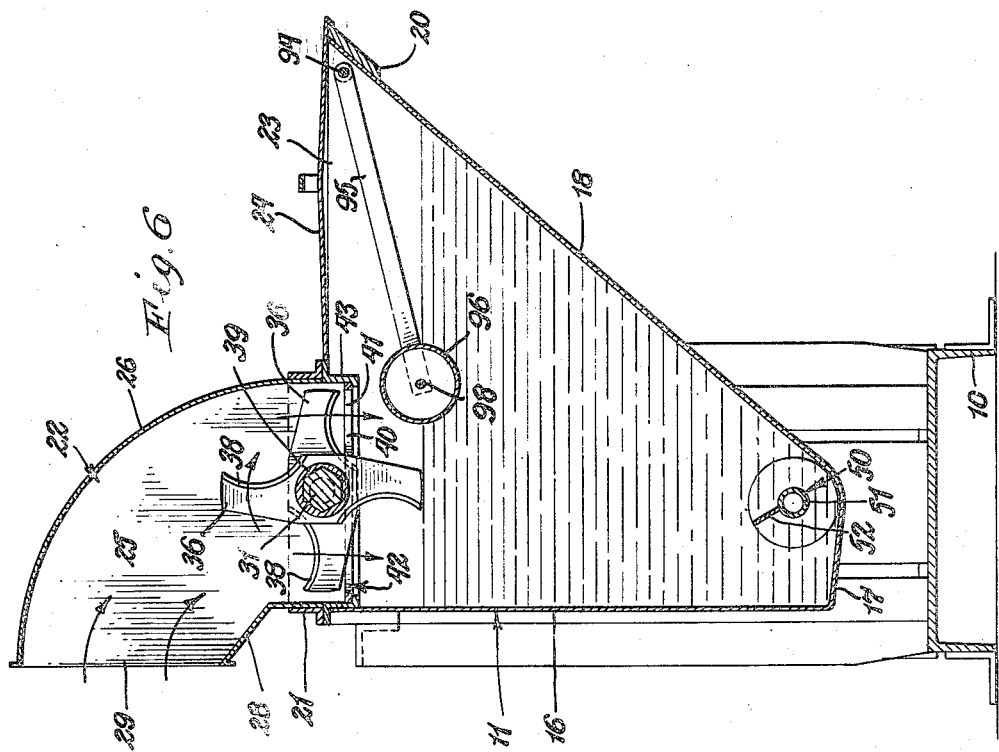

Patented Dec. 4, 1951

2,577,403

UNITED STATES PATENT OFFICE 2,577,403

APPARATUS FOR COMMINUTING MATERIALS

Robert H. Carson, Niagara Falls, N. Y., assignor to Chisholm-Ryder Company, Incorporated, Niagara Falls, N. Y., a corporation of New York Application August 16, 1947, Serial No. 768,954

2 Claims. (Cl. 146—106)

This invention relates to apparatus for comminuting materials, and more particularly to such apparatus for use in a cannery for chopping vegetables or fruit preparatory to pasteurization and subsequent packing or canning operations.

Chopping boxes heretofore used in canneries comprised a tank or vat having an inlet in its upper part housing a multi-blade rotary knife assembly which comminuted the vegetables or fruit introduced through the inlet and having an outlet in its bottom part connected with the inlet of a discharge pump for delivery of the comminuted vegetables or fruit to the pasteurizer or other apparatus used in packing or canning the fruit or vegetables. The rotary knife assembly and discharge pump were driven at a constant speed, this necessarily being at the maximum speed necessary to take care of the maximum load. As a result, when the vegetables or fruit were fed to the chopping box in batches, as often occurs, at the end of each batch the discharge pump would withdraw substantially all of the comminuted vegetables and fruit from the chopping box but would subject the end of the batch to a churning action in the presence of air thereby to aerate the comminuted vegetables or fruit. It is well known that aeration with consequent oxidation is extremely undesirable. Further than this, since the discharge pump was operated at the maximum speed regardless of load, the comminuted vegetables or fruit were subjected to the same degree of churning action under light loads as under heavy loads. Such chopping boxes were also subject to excessive wear since the discharge pump was operated at maximum speed under all load conditions and even when there was no load at all upon the chopping box as when waiting for another batch of fruit or vegetables to be comminuted.

One of the principal objects of the present invention is to provide apparatus for comminuting vegetables and fruit in which the aeration and oxidation of the comminuted product is greatly reduced, thereby to improve the quality and uniformity of the product.

Another object is to provide such apparatus which operates with a minimum churning of the comminuted vegetables or fruit.

Another object is to provide such apparatus having greatly increased life, this being accomplished by rendering the discharge pump inoperative when no vegetables or fruit are being fed to the apparatus.

Another object of the invention is to provide a product having greater uniformity by regulating the rate of discharge of the product in accordance with the rate at which the vegetables or fruit are fed to the apparatus.

Another object is to provide such apparatus which is automatically rendered inoperative in the event of an overload such as might be occasioned by a piece of wire becoming jammed in the apparatus, and which otherwise would be liable to cause breakage.

Another object is to provide such apparatus which is of simple and rugged construction and which will stand up under conditions of severe and constant use without getting out of order or requiring servicing.

Other objects and advantages will appear from the following description and drawings in which Fig. 1 represents a rear elevational view of apparatus for comminuting vegetables and fruit and constructed in accordance with my invention.

Fig. 2 is a top plan view thereof.

Fig. 3 is a front elevational view, partly in section.

Fig. 4 is an end elevational view, viewed from the left-hand end of Figs. 1 and 2.

Fig. 5 is an end elevational view viewed from the right-hand end of Figs. 1 and 2.

Fig. 6 is a vertical transverse sectional view taken on line 6—6, Fig. 3.

Figure 1:
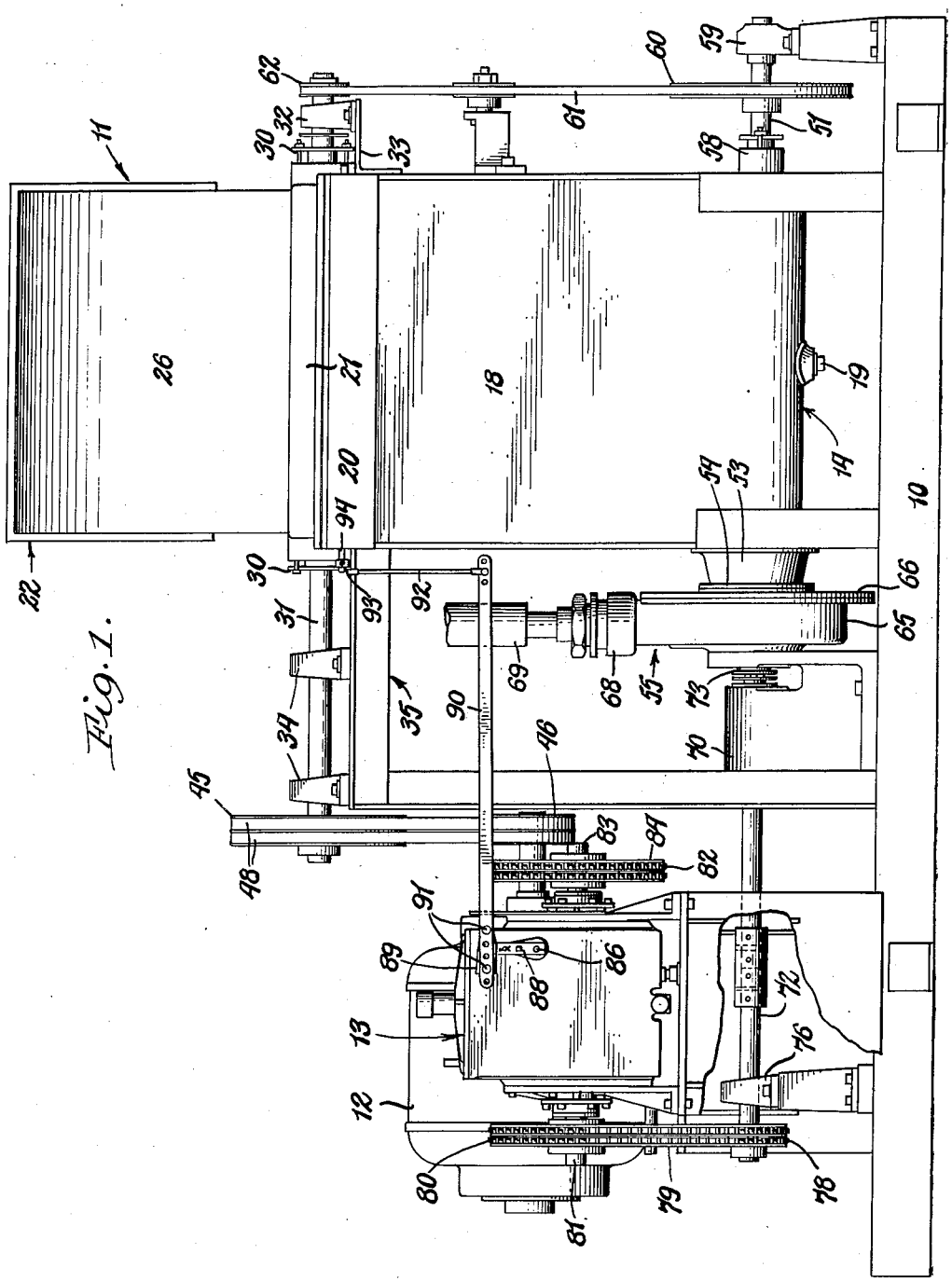

The apparatus is shown as mounted on a base 10 and as comprising a chopping box indicated generally at 11 and driven by an electric motor 12. A feature of the invention resides in the employment of a hydraulic transmission 13 in the drive between the motor and a part of the mechanism constituting the chopping box 11.

The chopping box is shown as comprising a sheet metal tank or vat 14 suitably supported on the base 10 and having parallel sheet metal side walls 15 connected at their edges to provide a front wall 16, a bottom 17 and a rear wall 18. The sides 15 are of such shape so that the front wall 16 is vertical, the bottom wall inclines downwardly to a drain plug 19, and the rear wall inclines upwardly and rearwardly as best shown in Fig. 6 to provide a relatively large top. The rim of the sheet metal vat or tank 14 is reinforced by a frame 20 of any suitable construction and on this frame is mounted the rectangular base 21 of the sheet metal inlet conduit 22. This base frame 21 and the sheet metal inlet 22 supported thereby extend substantially the full width of the tank or vat 14 but extend only part way back from the front wall 16 thereof so as to provide a rectangular access opening 23 of substantial size at the rear of the tank or vat. This access opening 23 is normally closed by a removable rectangular sheet metal cover 24 of any suitable construction.

The inlet 22 can be of any suitable construction but is shown as comprising curved or arcuate side walls 25 connected by a curving rear wall 26 and an inclined front wall 28 so as to provide a forwardly directed inlet opening 29 into which the vegetables or fruit to be comminuted are discharged by a conventional conveyor (not shown).

The vegetables or fruit so introduced are chopped or comminuted on entering the tank or vat 14. For this purpose the base frame 21 of the inlet 22 carries glands or stuffing boxes 30 through which the reduced ends of a knife shaft 31 extend, this shaft extending lengthwise of the base 10. At one end this knife shaft is shown as supported in a bearing 32 carried by a bracket 33 projecting from the frame 20 and at its other end this shaft is shown as journaled in a pair of bearings 34 carried by an auxiliary frame 35, this auxiliary frame being secured to the tank 14 and base 10 in any suitable manner. The portion of the knife shaft 31 within the inlet 22 is shown as being hexagonal in cross section, as shown in Fig. 6, and on this hexagonal portion are strung a series of knife blades 36. These knife blades are of flat form arranged at right angles to the axis of the shaft 31 and are centrally apertured with hexagonal holes to fit the hexagonal central part of the knife shaft 31 and to be rotated thereby. Each end of each knife is provided on one side with a curved cutting edge 38 and the series of knives are held in uniformly spaced relation by a series of annular spacers 39 interposed therebetween and fitting the knife shaft 31. The blades are alternately set at right angles to each other and each blade passes through a slot or opening 40 between the transverse bars 41 of a rectangular grill 42. This grill is supported below the spacers 39 on the knife shaft 31 with its slots 40 in cooperative relation with the blades 36 in any suitable manner and is shown as supported at its edges by flanged bars 43 which are secured below the transverse bars of the base frame 21 of the inlet 22 in any suitable manner.

The knife assembly as above described is continuously rotated in a clockwise direction, as viewed in Fig. 6, so that the cutting edges 38 of the knife blades chop or comminute the vegetables or fruit introduced through the inlet opening 29, the cuttings and juices being carried through the grill 42 to the tank or vat 14. For this purpose, a pulley 45 is fast to that end of the knife shaft 31 adjacent the motor 12 and is connected to a drive pulley 46 on the shaft of the motor 12 by one or more drive belts 48.

The comminuted vegetables or fruit in the tank or vat 14 are removed therefrom by a screw conveyor 50 in the bottom of the tank. As best shown in Fig. 3, this screw conveyor comprises an enlarged central part 51 within the tank or vat 14 and having a helical blade 52, the screw conveyor being arranged to propel the comminuted vegetables and fruit toward an outlet 53 in the form of a casting secured to the side of the tank or vat 14 adjacent the electric motor 12. This outlet casting 53 is provided with a rim 54 to which the cast of the centrifugal discharge pump 55 is secured and the outlet casting 53 is also formed to provide a depending arm 56 carrying a bearing 57 for the reduced end of the shaft 51 of the screw conveyor. The other reduced end of the conveyor extends through a gland or stuffing box 58 on the corresponding side wall of the tank or vat 14 and is journaled in a bearing 59 mounted on the base 10. A pulley 60 is fast to the reduced end of the conveyor shaft 51 adjacent bearing 59 and is connected by a drive belt 61 with a pulley 62 mounted on the corresponding end of the knife shaft 31.

The centrifugal pump 55 is shown as comprising a casing 65, one side of which is enclosed by a face plate 66, this face plate being secured to the rim 54 of the outlet casting 53. The tangential outlet 68 from the pump casing 65 is shown as being directed upwardly and as connected to an outlet line 69 through which the comminuted vegetables and fruit are delivered for further processing. The casing 65 is shown as supported on a bearing block 70, this bearing block carrying a bearing 71 for the pump shaft 72, this shaft extending through a gland or stuffing box 73 into the interior of the pump casing 65. A centrifugal impeller or pump rotor 74 of any suitable form is secured to the pump shaft 72 within the pump casing 65.

The extreme end of the pump shaft 72 is journaled in a bearing 76 mounted on the bed 10 and a sprocket 78 is fast thereto. This sprocket is connected by a chain 79 with a sprocket 80 fast to the output shaft 81 of the hydraulic transmission 13. A sprocket 82 is fast to the input shaft 83 of the hydraulic transmission 13 and is shown as connected by a chain 84 with a sprocket 85 on the drive shaft of the electric motor 12. The hydraulic transmission 13 is preferably of the form shown in my copending application Serial No. 768,953, filed August 16, 1947, for Hydraulic Transmission and to which reference is made for a detailed description of the same. In general, however, the hydraulic transmission comprises a transmission casing adapted to contain a body of working liquid, the coaxial input and output shafts 83, 81 journaled horizontally in this casing, a pump casing fast to one of the shafts and journaled on the other of said shafts and having an inlet and an outlet communicating with the interior of the transmission casing, a pump rotor in the pump casing and fast to the other of these shafts and propelling the working liquid from said inlet to said outlet of said pump, and a valve for throttling the passage of the liquid through the pump, this valve being opened and closed by oscillating a control shaft 86 projecting outwardly from one side of the transmission casing.

A rock lever 88 is fast to the end of the control shaft 86 and projects upwardly therefrom. This rock lever is shown as provided with horizontal extensions 89 at its upper end, to which an elongated rock arm 90 is shown as connected at two points, as indicated at 91, so that raising or depressing the rock arm 90 oscillates the rock lever 88 to actuate the control shaft 86. The free end of the rock arm 90, as best shown in Fig. 1, projects toward the vat or tank 14 and is suspended by a shipper rod 92 from the free end of an arm 93 fast to a horizontal shaft 94 extending through the vat or tank 14 immediately below the access opening 23 therein, this rock shaft 94 being journaled in the tank or vat 14 in any suitable manner. Within the casing or tank 14 a pair of spaced arms 95 are fast to the rock shaft 94 and normally project in a generally horizontal direction toward the inlet to this tank or vat. The free ends of the spaced arms 95 are supported by a float 96. This float is shown as being in the form of an enclosed cylinder having a coaxial shaft 98 extending therethrough. The projecting ends of this shaft 98 are journaled in the free ends of the spaced arms 95 so that the float 96 is capable of rotation.

*Operation*

In the depressed condition of the float 96 the control shaft 86 of the hydraulic transmission 13 is adjusted to that position in which the throttling valve (not shown) of the hydraulic transmission 13 is fully opened so that no power is transmitted from the input shaft 83 of this transmission to the output shaft 81 thereof. In consequence, the discharge pump 55 is inoperative. However, the electric motor 12 is rotating the knife shaft 31 and the knives 36 carried thereby as well as the screw conveyor 50 in the bottom of the tank or vat 14. This drive is from the pulley 46 fast to the drive shaft of the electric motor and belts 48 to the pulley 45 on the knife shaft 31 and from the knife shaft 31, which carries the knife blades 36, from the pulley 62 fast to its opposite end and through the belt 61 to the pulley 60 fast to the reduced end of the shaft 51 of the screw conveyor 50.

When a batch of, say, tomatoes is introduced through the inlet opening 29 of the materials inlet 22, these tomatoes are immediately acted upon by the multiplicity of blades 36 fast to the knife shaft 31, these blades rotating in a clockwise direction as viewed in Fig. 6 so that their cutting edges 38 cut into the tomatoes and force the tomatoes against the bars 41 of the grill 42 through which these knife blades pass. The tomatoes are therefore chopped or comminuted and forced through the openings 40 of the grill 42 and accumulate in the tank or vat 14. As the level of the comminuted tomatoes in the tank or vat 14 rises, the cylindrical float 96 is raised to move the spaced arms 95 upwardly toward the position shown in Fig. 6. This upward movement of these spaced arms 95 oscillates the rock shaft 94 to which they are fast so as to elevate the arm 93. This lifts the shipper rod 92 so as to elevate the rock arm 90 which in turn is fast to the rock lever 88. This rock lever 88, together with the control shaft 86 to which it is secured, is therefore rotated in a counterclockwise direction, as viewed in Fig. 1. This counterclockwise rotation of the control shaft 86 operates to close the throttling valve (not shown) of the hydraulic transmission 13 and thereby establishes a hydraulic coupling between the input shaft 83 and output shaft 81 of the hydraulic transmission. This coupling is, however, progressive, the initial closing movement of the throttling valve (not shown) causing the output shaft 81 to be driven at a reduced speed and the elevation of the cylindrical float 96 to its highest position causing the throttling valve (not shown) of the hydraulic transmission 13 to be completely closed so that its output shaft 81 is hydraulically locked with its input shaft 83 and hence driven at the same speed. With any degree of hydraulic coupling between the input shaft 83 of the hydraulic transmission 13 and the output shaft thereof, power is transmitted from the sprocket 85 fast to the drive shaft of the motor 12 through the drive chain 84 to the sprocket 82 fast to the input shaft 83 of the hydraulic transmission, thereby to rotate the output shaft 81 hydraulically coupled therewith. From the output shaft 81 of the hydraulic transmission power is transmitted from its sprocket 80 through the drive chain 79 to the sprocket 78 fast to the pump shaft 72. This rotates the pump shaft 72 of the pump 55 and the pump impeller 74 thereon. As a result, the comminuted tomatoes which are being urged toward the outlet casing 53 by the screw conveyor 50 are picked up by the impeller 74 of the pump 55 and discharged through its tangential outlet 68 into the line 69 which connects with the pasteurizer (not shown) or other apparatus used in the subsequent processing of the comminuted tomatoes.

If the tomatoes are introduced in a full quantity, the cylindrical float 96 rises to its maximum elevation in which it completely closes the throttling valve (not shown) of the hydraulic transmission so that the input and output shafts 83, 81 of this transmission are hydraulically locked so as to drive the discharge pump 55 at its maximum speed. If, however, the stream of tomatoes admitted through the inlet 22 should diminish, the cylindrical float 96 lowers so as to partially open the throttling valve (not shown) of the hydraulic transmission so that the output shaft 81 of this hydraulic transmission rotates at a reduced speed as compared with its input shaft 83 so that the pump 55 is driven at a reduced speed. It will therefore be seen that the delivery of the comminuted tomatoes by the pump 55 is regulated in accordance with the rate at which the tomatoes are supplied to the chopping box and that the discharge pump 55 is only rotated at a speed sufficient to take care of the quantity of tomatoes being supplied to the chopping box.

The tomatoes are frequently supplied in batches and when the last of the batch of tomatoes passes into the tank or vat 14 the level of the comminuted tomatoes therein will, of course, continue to drop, since at this time the discharge pump 55 is in operation, although at a progressively reduced speed. When the cylindrical float 96 reaches its lowermost position it has adjusted the throttling valve (not shown) of the hydraulic transmission 13 to its fully opened position, under which condition there is no hydraulic coupling between the input shaft 83 and output shaft 81 of this hydraulic transmission. This breaks the driving connection between the electric motor 12 and the discharge pump 55 so that this discharge pump is rendered completely inoperative. Hence, until another batch of tomatoes is introduced into the inlet 22 the discharge pump 55 is inoperative and no wear and tear takes place. Further, it will be noted that even when no tomatoes are being supplied to the tank or vat 14, a substantial body of comminuted tomatoes is maintained therein so that the plates of the screw conveyor 50 and discharge pump 55 are at all times submerged in the comminuted tomatoes. This avoids a condition where air is beaten into the comminuted tomatoes with the resulting undesirable oxidation thereof and is in distinct contrast to prior chopping boxes in which the end of each batch of comminuted tomatoes is subjected to a violent churning action in the presence of air by both the screw conveyor and the discharge pump.

From the foregoing it will be seen that the present invention provides apparatus for comminuting vegetables and fruit which is simple and rugged in construction and at the same time automatically adjusts the operation of the discharge pump in accordance with the rate of supply of the fruit or vegetables to the apparatus, rendering this pump completely inoperative when the supply is cut off and maintaining the screw conveyor and discharging pump fully submerged at all times so that aeration of the product is reduced to a minimum. It will therefore be seen that a higher quality and more uniform product is produced and at the same time the wear and tear upon the apparatus is reduced.

I claim:

1. Apparatus for comminuting materials, comprising a vat having a materials inlet in its upper part and a materials outlet in one side of its bottom part, a shaft arranged adjacent said materials inlet, a comminuting mechanism driven by said shaft and arranged across said materials inlet, a screw shaft journalled in the walls of said vat and having a screw thread arranged in said vat directly below said comminuting mechanism and arranged to propel the comminuted materials toward said side outlet, a prime mover driving said shafts at constant speeds, a centrifugal pump casing having its inlet connected with said side outlet, a pump rotor in said centrifugal pump casing, an adjustable variable speed transmission operatively arranged between said prime mover and said pump rotor, and means responsive to the level of materials in said vat and arranged to adjust said transmission and operate said pump rotor at a speed to maintain said screw thread submerged regardless of the rate of feed of materials to the apparatus.

2. Apparatus for comminuting materials, comprising a vat having a materials inlet in its upper part and a materials outlet in one side of its bottom part, a shaft arranged adjacent said materials inlet, a comminuting mechanism driven by said shaft and arranged across said materials inlet, a screw shaft journalled in the walls of said vat and having a screw thread arranged in said vat directly below said comminuting mechanism and arranged to propel the comminuted materials toward said side outlet, a prime mover driving said shafts at constant speeds, a centrifugal pump casing having its inlet connected with said side outlet, a pump rotor in said centrifugal pump casing, an adjustable variable speed transmission operatively arranged between said prime mover and said pump rotor, a float in said vat and responsive to the level of the comminuted materials therein, and means arranged to adjust said transmission in response to the movement of said float thereby to operate said pump rotor at a speed to maintain said screw thread submerged regardless of the rate of feed of materials to the apparatus.

ROBERT H. CARSON,

REFERENCES CITED

The following references are of record in the file of this patent:

UNITED STATES PATENTS

| Number | Name | Date |
|---|---|---|
| 872,298 | Leonard | Nov. 26, 1907 |
| 1,621,221 | Pogue | Mar. 15, 1927 |
| 1,652,044 | Nenzel | Dec. 6, 1927 |
| 1,967,022 | Chandler | July 17, 1934 |
| 2,137,388 | Chapman | Nov. 22, 1938 |
| 2,327,448 | Olive | Aug. 24, 1943 |
| 2,408,221 | Michel | Sept. 24, 1946 |